Nov. 19, 1935.  W. FULDA ET AL  2,021,546
METHOD OF PRODUCING PURE ALUMINA
Filed June 1, 1934
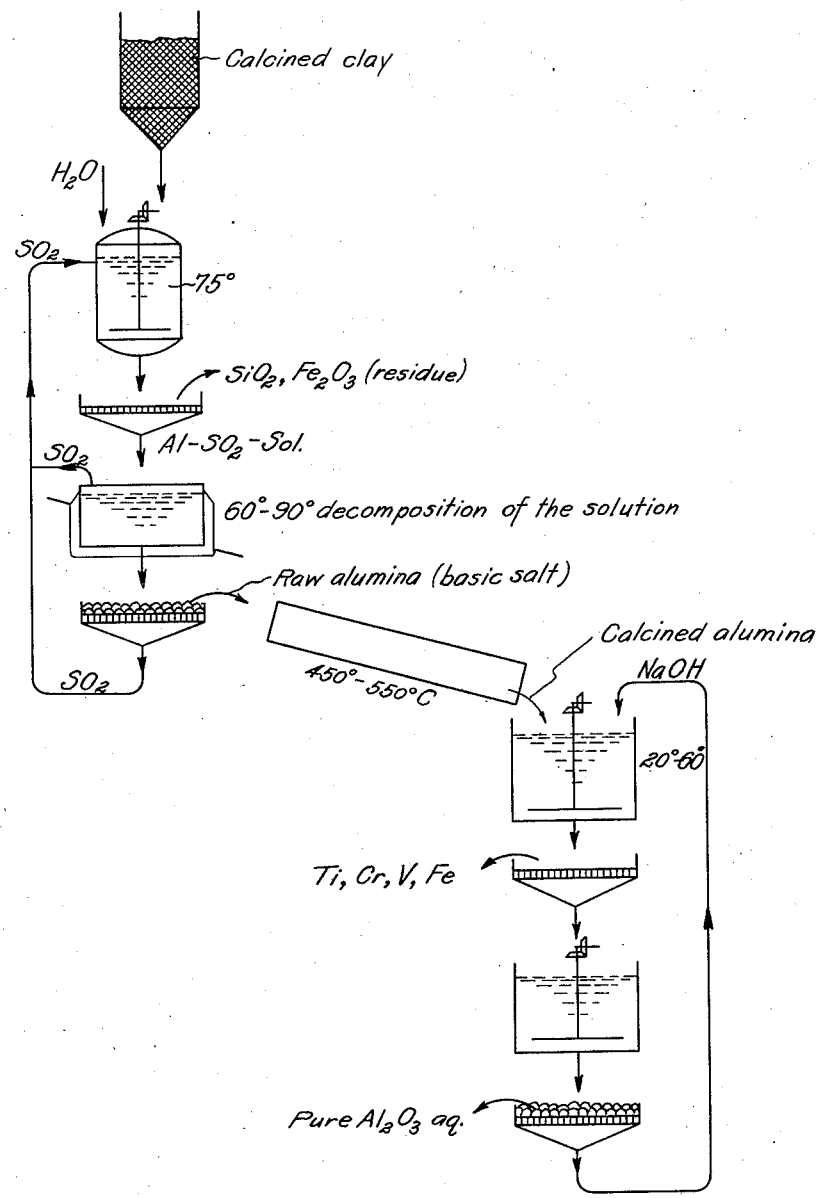
Inventors:
Wilhelm Fulda
Erich Wiedbrauck and
Rudolf Reinhard Bruno Wittig
By Potter, Pierce & Scheffler
their Attorneys.

Patented Nov. 19, 1935

2,021,546

UNITED STATES PATENT OFFICE 2,021,546

METHOD OF PRODUCING PURE ALUMINA

Wilhelm Fulda, Lautawerk, Erich Wiedbrauck, Essen, and Rudolf Reinhard Bruno Wittig, Lautawerk, Germany, assignors to the firms Vereinigte Aluminium-Werke Aktiengesellschaft, Lautawerk (Lausitz), Germany, and Th. Goldschmidt A.-G., Essen (Ruhr), Germany Application June 1, 1934, Serial No. 728,622
In Germany June 8, 1933

8 Claims. (Cl. 23—143)

This invention relates to a method of producing pure alumina.

In the treatment of clay and similar minerals with the assistance of acids for the production of alumina it has heretofore usually been overlooked that the clays contain a number of slight impurities, which also are more or less dissolved by the acids. These are chiefly the oxides of chromium, vanadium, titanium and phosphorous. If special precautions are not taken, these substances are liable to be separated together with the alumina. Upon treatment of the alumina to produce aluminum they then enter into the metal, and render the latter, for many purposes, inferior. In this manner, for example, by reason of these substances, the electrical conductivity of the aluminum is very greatly reduced.

According to the invention, an alumina satisfying all requirements with regard to purity may be obtained from clay and similar silicious minerals, such as China clay, leucite, etc., by disintegrating these minerals in the known manner by calcination and treatment with watery sulphurous acid, separating the resulting clear solution from the insoluble silicic acid, precipitating a raw alumina from the clear solution, calcining the raw alumina, dissolving the calcined raw alumina in the known fashion in alkaline liquor, and treating the resulting solution, after separation of the impurities, to produce a pure hydrate of alumina. The raw alumina is preferably produced by decomposing the aluminum sulphite solution by heating and the passage of steam, so that a hydrate is obtained, which is as poor as possible in sulphur. The sulphurous acid escaping may again be utilized in the process. This procedure is shown in the accompanying drawing which is a flow sheet of the process.

The precipitated raw alumina, in accordance with the invention, may be boiled for a certain length of time with a solution of common salt in order to reduce the sulphur content. The residual sulphur compounds still remaining in the raw alumina may be conveniently removed by alkaline means. In order to render any iron compounds in the raw alumina harmless, the dissolving of the raw hydrate of alumina in the alkaline liquor is carried out with the admission of air, so that the iron compounds are oxidized. By reason of the described combination it is accomplished that for the production of the alumina there may be employed the cheapest raw material (clay) and the cheapest disintegrating agent ($SO_2$), and notwithstanding the alumina possesses the highest degree of purity, i. e., the purity of Bayer alumina.

It is known to disintegrate the previously heated clay by means of watery sulphurous acid, with or without pressure. After removal of the silicic residue a clear aluminum sulphite solution is obtained. Certain difficulty is encountered initially in obtaining from this aluminum sulphite solution a raw alumina containing the smallest possible amount of $SO_2$, in order that the loss of alkali will be as small as possible when again dissolving the alumina in the alkaline liquor.

To obtain a raw alumina as poor as possible in sulphur, one of two methods may be adopted:

In the first place the aluminum sulphite solution may be decomposed by means of steam. If weak sulphite solutions and an excess of steam are employed, a raw alumina is precipitated right at the very commencement containing little sulphur.

The S-content may be further diminished by lengthy boiling of this solution. It has been found to be particularly suitable to allow the precipitated raw alumina to settle, to remove the upper solution, and then to boil the raw alumina with a concentrated solution of salt. For this purpose there may be employed, for example, a sodium chloride or calcium chloride solution. By increasing the boiling point of the salt solution removal of the sulphurous acid from the deposit is considerably accelerated. Finally, the slight traces of sulphurous acid still remaining in the raw alumina may be removed by caustic lime or soda or ammonia. The ammonia may be recovered from the solution in the known fashion by distillation. The alumina is then dissolved in sodium lye or aluminate lye, in similar fashion to bauxite in the Bayer process, and from the lye alumina produced in purest form in the known manner.

Secondly, in place of the method just described, the procedure may also be such that the sulphite solution is decomposed in the known fashion at temperatures between 75° and 95°. The raw alumina, which in this case may contain a comparatively large amount of sulphurous acid, is filtered and calcined at a temperature of less than 900°, and preferably of 450–550°. In this connection it has been found that the presence of inert or reducing gases is particularly favorable, as oxidation of the sulphurous acid is then prevented and any sulphite which may have been formed is reduced.

A particular advantage of this process resides in the fact that an alumina is obtained, which may be dissolved in sodium lye more readily than any other technical alumina known heretofore. The same may be dissolved without pressure in the lyes which are obtained upon stirring in the Bayer process, and the temperatures may be kept between 20 and 50°. This has the advantage that the aluminate lye does not require evaporation as otherwise necessary in the Bayer process, and moreover that the lye does not require to be raised to high temperatures, as otherwise essential in an autoclave.

Before the raw alumina is dissolved in alkaline liquors the small traces of sulphides remaining may be removed also in this case by alkaline means.

To facilitate comprehension of the invention two examples may be quoted as follows:

I

From a clear aluminum sulphite solution with 30 grammes per litre $Al_2O_3$ and 120 grammes per litre $SO_2$, obtained by the known sulphurous acid disintegration of heated clay, there was precipitated by hydrolysis, for example with superheated steam, a raw hydrate of alumina, which contained for every 100 parts by weight of alumina 28 parts by weight of $SO_2$ and, after expelling the greater part of the $SO_2$ by boiling, revealed the following composition:

| | Per cent |
|---|---|
| $Al_2O_3$ | 22.62 |
| $SO_2$ | .51 |
| $Fe_2O_3$ | .04 |
| $TiO_2$ | .01 |
| $Cr_2O_3$ | .006 |
| $V_2O_5$ | .005 |
| $SiO_2$ | .08 |

This raw alumina is then dissolved in the known fashion in aluminate lye according to the Bayer process at 20–60°, in the manner usual in the case of bauxite.

II

From an aluminum sulphite solution of the following composition:

33.5 grammes $Al_2O_3$ and 250 grammes $SO_2$ per litre, with the following impurities (calculated on the basis of 100 parts $Al_2O_3$):

| | Parts |
|---|---|
| $Fe_2O_3$ | 7.5 |
| $SiO_2$ | .54 |
| $P_2O_5$ | .19 |
| $SO_3$ | 1 |
| $TiO_2$ | .057 |
| $Cr_2O_3$ | .023 |
| $V_2O_5$ | .043 | there was precipitated by hydrolysis a raw hydrate of alumina with 25.5% $Al_2O_3$ and 30.6% $SO_2$. This contains for every 100 parts $Al_2O_3$

| | Parts |
|---|---|
| $Fe_2O_3$ | .16 |
| $SiO_2$ | .024 |
| $P_2O_5$ | .2 |
| $SO_3$ | 1.4 |
| $TiO_2$ | .05 |
| $Cr_2O_3$ | .024 |
| $V_2O_5$ | .046 |

The product was freed to a large extent of water and $SO_2$, a residue being obtained of the following composition:

| | Per cent |
|---|---|
| $Al_2O_3$ | 88.8 |
| $SO_3$ | 2.7 |
| $SO_2$ | .3 | and in addition thereto the impurities of $TiO_2$, $Cr_2O_3$ and $V_2O_5$, as in the original hydrate, and a certain quantity of water.

If the product was calcined at 550° with the conduction of hydrogen gas, the following product was obtained:

| | Per cent |
|---|---|
| $Al_2O_3$ | 90.4 |
| $SO_3$ | .93 |
| $SO_2$ | .35 |

The calcination product was dissolved in sodium lye, the impurities iron, titanium and chromium remaining behind in undissolved condition. After filtration there was obtained from the aluminate lye by mixing a pure hydrate of alumina.

What we claim as new and desire to secure by Letters Patent is:

1. Process for the manufacture of alumina which comprises disintegrating clay and similar minerals by calcination and treatment with an aqueous solution of sulfurous acid thereby producing an aqueous solution containing aluminum sulfite, precipitating alumina from said solution by heating, calcining the precipitated alumina, dissolving the calcined alumina in alkali lye and precipitating alumina from the resulting solution by heating.

2. Process as defined in claim 1 in which alumina is precipitated from the solution containing aluminum sulfite by heating at from 75° to 95° C. and in which the so precipitated alumina is calcined at a temperature below 900° C.

3. Process as defined in claim 1 in which the precipitated alumina is calcined at from 450° C. to 550° C.

4. Process as defined in claim 1 in which the calcination of the precipitated alumina is carried out in a non-oxidizing atmosphere.

5. Process as defined in claim 1 in which the precipitated and calcined alumina is dissolved in dilute soda lye at a temperature of from 20° to 60° C.

6. Process as defined in claim 1 in which the calcined alumina is dissolved in a dilute aluminate lye.

7. Process as defined in claim 1 in which the alumina is calcined in a reducing atmosphere.

8. Process as defined in claim 1 in which the calcined alumina is dissolved in an alkali lye while introducing air into the lye.

WILHELM FULDA.
ERICH WIEDBRAUCK.
RUDOLF REINHARD BRUNO WITTIG.